US008091996B2

(12) United States Patent
Seki et al.

(10) Patent No.: US 8,091,996 B2
(45) Date of Patent: Jan. 10, 2012

(54) FLUID CONTAINER, RECYCLING METHOD OF FLUID CONTAINER, AND SEALING METHOD OF FLUID CONTAINER

(75) Inventors: Yuichi Seki, Matsumoto (JP); Hidenori Futatsugi, Azumino (JP); Yasunao Uehara, Matsumoto (JP); Masahide Matsuyama, Higashichikuma-Gun (JP); Yasuhiro Ogura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 966 days.

(21) Appl. No.: 12/027,632

(22) Filed: Feb. 7, 2008

(65) Prior Publication Data

US 2008/0187354 A1 Aug. 7, 2008

(30) Foreign Application Priority Data

Feb. 7, 2007 (JP) ................................ 2007-027908

(51) Int. Cl.
*B41J 2/175* (2006.01)
*F16L 17/00* (2006.01)

(52) U.S. Cl. ........................................ 347/86; 285/10

(58) Field of Classification Search .................... 347/29, 347/85, 86, 87; 156/249, 250, 252, 260; 277/304; 285/10, 95; 428/343; 292/307 R
See application file for complete search history.

(56) References Cited

U.S. PATENT DOCUMENTS

| | | | | |
|---|---|---|---|---|
| 5,400,060 | A * | 3/1995 | Carlotta | 347/29 |
| 6,547,366 | B2 * | 4/2003 | Sharma et al. | 347/22 |
| 6,588,875 | B1 * | 7/2003 | Kleinhammer | 347/29 |
| 6,634,732 | B2 * | 10/2003 | Farr et al. | 347/29 |
| 7,540,584 | B2 * | 6/2009 | Bertelsen et al. | 347/29 |
| 7,776,175 | B2 * | 8/2010 | Silverbrook et al. | 156/252 |
| 2003/0052939 | A1 | 3/2003 | Farr et al. | |
| 2006/0151086 | A1 | 7/2006 | Silverbrook et al. | |

FOREIGN PATENT DOCUMENTS

| | | | |
|---|---|---|---|
| EP | 0 503 497 | A2 | 9/1992 |
| EP | 0 514 632 | A2 | 11/1992 |
| EP | 0 576 237 | A2 | 12/1993 |
| EP | 0 792 749 | A2 | 9/1997 |
| EP | 1 090 767 | A2 | 4/2001 |
| JP | 9-123472 | A | 5/1997 |
| JP | 9-207352 | A | 12/1997 |
| JP | 3667749 | B1 | 4/2005 |

* cited by examiner

*Primary Examiner* — Anh T. N. Vo
(74) *Attorney, Agent, or Firm* — Sughrue Mion, PLLC

(57) ABSTRACT

A method for sealing an opening formed in a cover film welded to a fluid retainer at a position corresponding to a covered area of an ink inlet hole. A sealing member, which seals the opening, is a laminated film including a first film and a second film. The method includes preparing the laminated film, placing the laminated film on the fluid container with the first film facing the fluid container in such a manner that the laminated film covers the opening, and sealing the opening with the laminated film by heating the sealing member covering the opening from the side corresponding to the second film to melt the first film.

4 Claims, 5 Drawing Sheets

FLUID CONTAINER, RECYCLING METHOD OF FLUID CONTAINER, AND SEALING METHOD OF FLUID CONTAINER

CROSS-REFERENCE TO RELATED APPLICATION

This application is based upon and claims the benefit of priority from prior Japanese Patent Application No. 2007-027908, filed on Feb. 7, 2007, the entire content of which is incorporated herein by reference.

BACKGROUND

1. Technical Field

The present invention relates to a fluid container containing fluid, a recycling method of a fluid container by refilling a used fluid contained with fluid, and a sealing method of a fluid container.

2. Related Art

An ink cartridge removably mounted in an inkjet printer (hereinafter, referred to as a printer), which is a type of fluid ejection apparatus, for example, is known as a fluid container containing fluid. The ink cartridge includes a container body having a substantially flat box-like shape. An ink chamber is defined in the container body and contains ink as the fluid. An ink inlet hole is formed in a lower surface of the container body. Ink is initially introduced into the ink chamber through the ink inlet hole. A film is applied to the lower surface of the container body to cover the ink inlet hole, thus suppressing leakage of the ink through the ink inlet hole.

As the printer consumes the ink in the ink cartridge mounted in the printer, the ink in the ink chamber decreases and is eventually used up. The used ink cartridge is replaced by a new ink cartridge. Even after the ink cartridge is removed from the printer, the container body of the ink cartridge is still usable for repeated cycles. Japanese Patent No. 3667749 discloses a technique by which a used ink cartridge is recycled as a reusable ink cartridge by refilling the container body with ink. This addresses to efficient use of resources and preservation of environments.

In the method described in Japanese Patent No. 3667749, a film sealing an ink inlet hole is peeled off before an ink cartridge is refilled with ink. The ink is then charged into an ink chamber through the ink inlet hole. Afterwards, the ink inlet hole is sealed with a rubber stopper and a welding film is mounted on the body of the container in such a manner as to cover the ink inlet hole. The welding film is then thermally welded to a portion of the surface of the container body encompassing the ink inlet hole. This seals the ink inlet hole.

In this method, following supply of the ink refill, the ink inlet hole is blocked by the rubber stopper and the welding film is thermally welded to the portion of the surface of the container body encompassing the ink inlet hole. In other words, the method involves blocking the ink inlet hole using the rubber stopper and thermally welding the film after refilling the ink cartridge with the ink. This complicates the refilling of the ink cartridge and increases the number of components needed for sealing, thus raising the costs.

Further, as the welding film, an adhesive tape of polyester, which is a thermally welding adhesive tape of plastic, is employed. Although a polyester based film exhibits an improved thermal welding property, heat resistance of the film is low compared to a polyethylene terephthalate based film generally used as a sealing film of an ink cartridge. This decreases the reliability of the polyester based film. Thus, if blocking the ink inlet hole using the robber stopper is omitted, or the ink inlet hole is only sealed by the polyester based film, to facilitate the sealing of the hole and reduce the number of necessary components and the costs, the low reliability of the polyester based film may lead to leakage of the ink from the ink chamber through the ink inlet hole.

SUMMARY

Accordingly, it is an objective of the present invention to reliably and easily seal an opening to be sealed through which fluid is introduced into a used fluid container.

In order achieve the foregoing objective and in accordance with a first aspect of the present invention, a method for sealing an opening to be sealed is provided. The opening to be sealed is one of a hole formed in a fluid container and a hole formed in a cover film welded or bonded to the fluid container in such a manner as to cover the hole of the fluid container. The method includes: preparing a sealing member, the sealing member being a laminated film formed by laminating a plurality of films including a first film and a second film, wherein the first film is meltable at a predetermined heating temperature, and the second film is not meltable at the heating temperature and exhibits an improved heat resistance compared to the first film, the first film forming one of outermost layers of the laminated film, the second film forming the other of the outermost layers; placing the sealing member on the fluid container with the first film facing the fluid container in such a manner that the sealing member covers the opening to be sealed; and sealing the opening to be sealed with the sealing member by heating the sealing member from the second film side to melt the first film.

In accordance with a second aspect of the present invention, a method for recycling a fluid container is provided. The method includes: refilling a used fluid container through an opening to be sealed with a fluid, the opening to be sealed being one of a hole formed in the fluid container and a hole formed in a cover film welded or bonded to the fluid container in such a manner as to cover the hole: preparing a sealing member, the sealing member being a laminated film formed by laminating a plurality of films including a first film and a second film, wherein the first film is meltable at a predetermined heating temperature, and the second film is not meltable at the heating temperature and exhibits an improved heat resistance compared to the first film, the first film forming one of outermost layers of the laminated film, the second film forming the other of the outermost layers; placing the sealing member on the fluid container with the sealing member facing the fluid container in such a manner that the sealing member covers the opening to be sealed; and sealing the opening to be sealed with the sealing member by heating the sealing member from second film side to melt the first film.

In accordance with a third aspect of the present invention, a fluid container recycled using the method for recycling the fluid container according to the above second aspect of the present invention is provided.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF EXEMPLARY EMBODIMENTS

An embodiment of the present invention will now be described with reference to FIGS. 1 to 7. In the following description, the "front-and-rear direction", the "left-and-right" direction, and the "up-and-down" direction are the directions indicated by the corresponding arrows in FIGS. 1 to 4.

Figure 2:
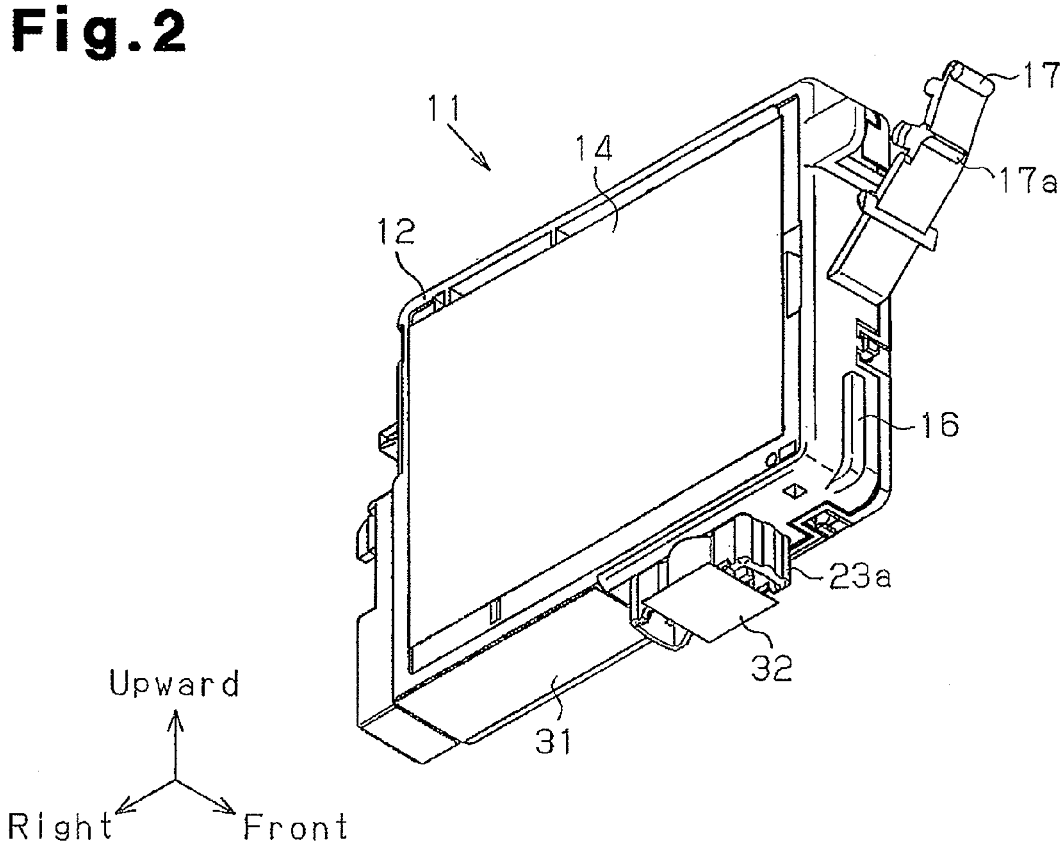
FIG. 2 is a rear perspective view showing the ink cartridge of FIG. 1.
Figure 3:
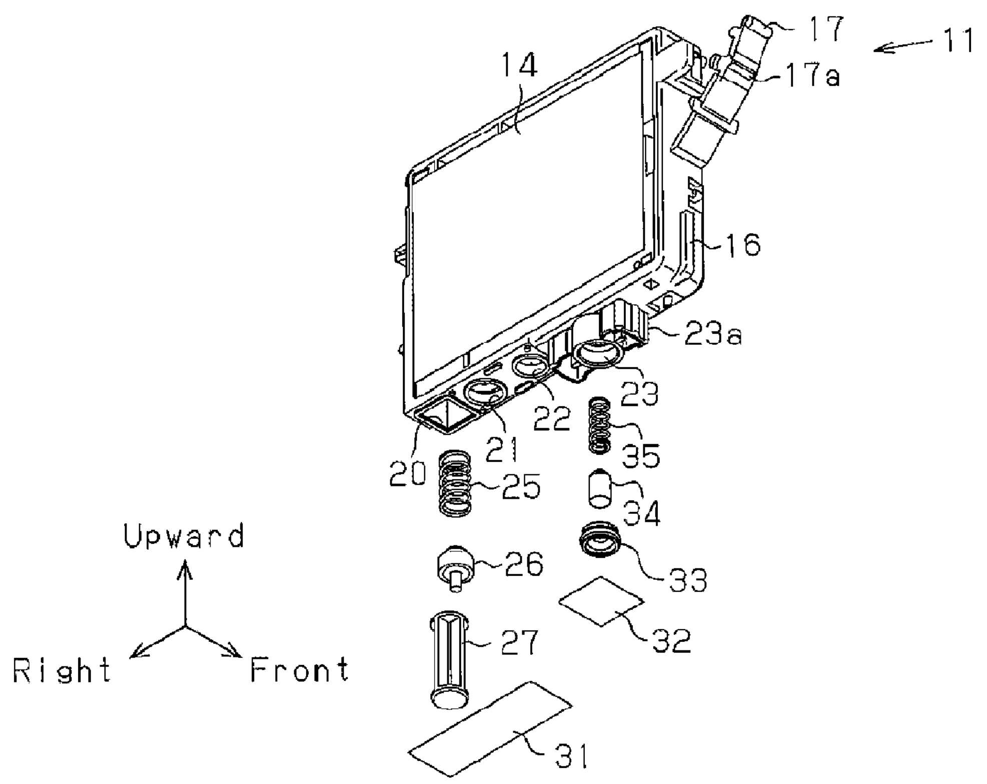
FIG. 3 is a partially exploded front perspective view showing the ink cartridge of FIG. 1.
Figure 4:
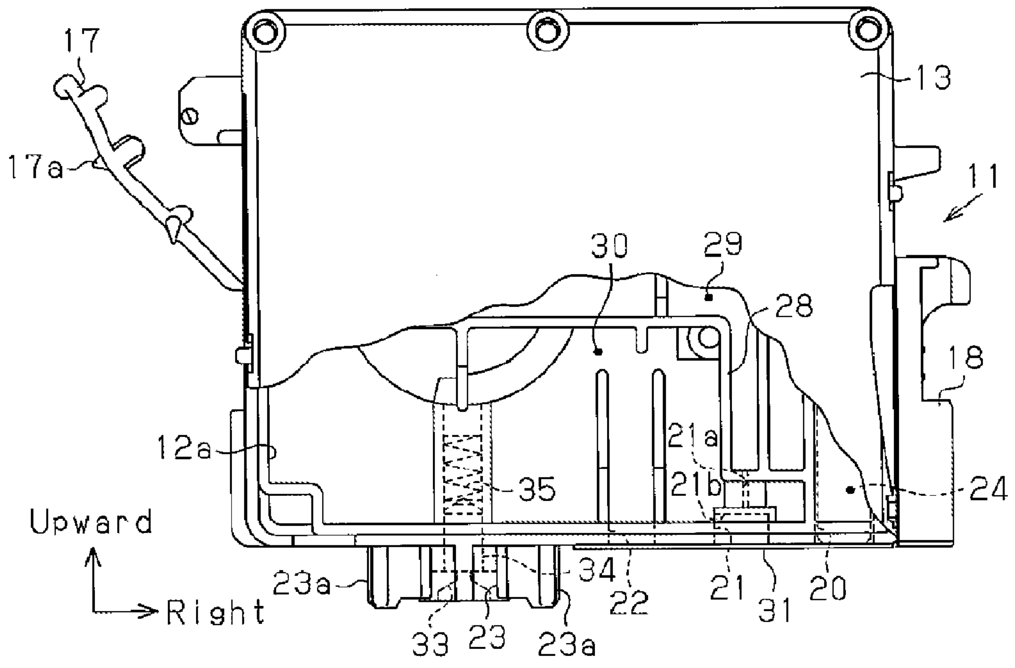
FIG. 4 is a partially exploded front view showing the ink cartridge of FIG. 1.

As shown in FIGS. 1 to 4, an ink cartridge 11, or a fluid container of the illustrated embodiment, includes a container body 12, which is shaped substantially like a flat rectangular box and formed of synthetic resin, which is, for example, polypropylene (PP). With reference to FIG. 4, an opening 12*a* is formed in a front surface of the container body 12. A film member (not shown), which is formed of thermally adhesive material, is welded to the container body 12 to substantially cover the entire opening 12*a*. A lid body 13 is detachably attached to the container body 12 from outside the film member (the side corresponding to the front surface) in such a manner that the opening 12*a* is shielded. A film member 14, which is formed of thermally adhesive material, is bonded to a rear surface of the container body 12 to substantially cover the entire rear surface. An elongated ID label 15, which represents the color of the ink, or the fluid, contained in the ink cartridge 11, is welded to an upper surface of the container body 12.

As shown in FIGS. 2 to 4, a guide projection 16 extending in the up-and-down direction projects from a lower portion of a left surface of the container body 12. If the ink cartridge 11 is mounted in a cartridge holder (not shown) of an inkjet printer (hereinafter, referred to as a printer), which is a type of fluid ejection apparatus, the guide projection 16 is received in a guide recess (not shown) formed in the cartridge holder. This guides the ink cartridge 11 when the ink cartridge 11 is mounted in the cartridge holder.

With reference to FIGS. 1 to 4, an elastically deformable engagement lever 17, which projects diagonally to the upper left, is arranged at a position above the guide projection 16 on the left surface of the container body 12. An engagement piece 17*a*, which extends horizontally (in the front-and-rear direction), projects substantially from the longitudinal center of the engagement lever 17 on a surface of the engagement lever 17. Thus, when the ink cartridge 11 is mounted in the cartridge holder of the printer, the engagement lever 17 elastically deforms and the engagement piece 17*a* becomes engaged with a portion of the cartridge holder. This positions the ink cartridge 11 with respect to the cartridge holder. The ink cartridge 11 is thus secured to the cartridge holder in the positioned state.

Figure 1:
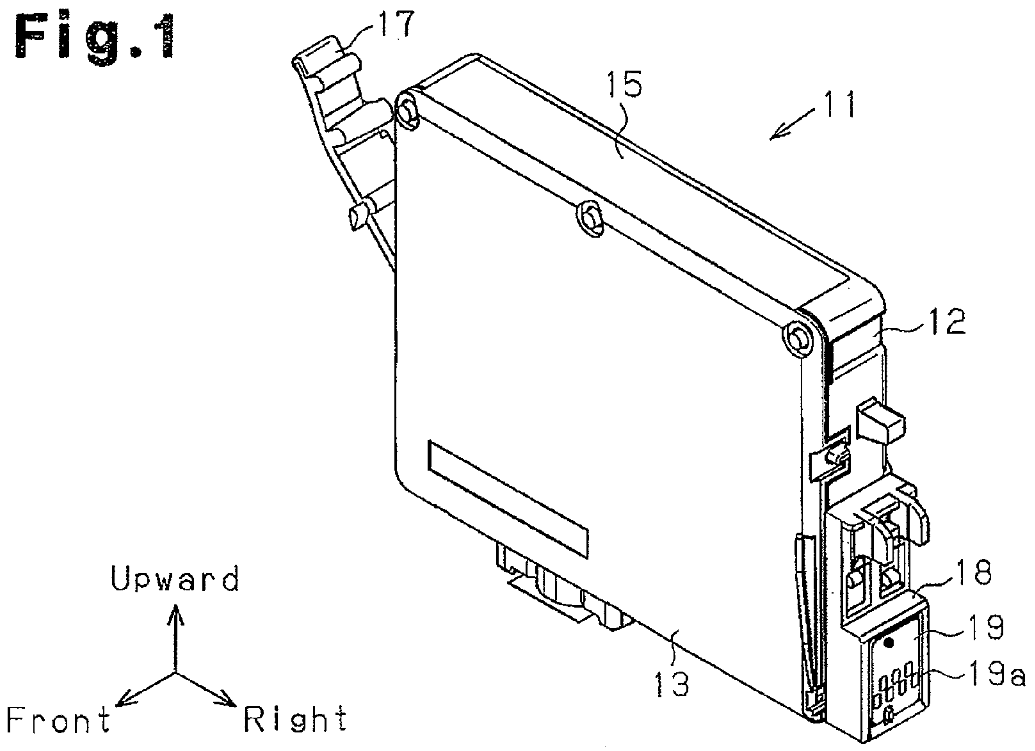
FIG. 1 is a front perspective view showing an ink cartridge according to one embodiment of the present invention.

As shown in FIG. 1, a substrate unit 18 is secured to a lower portion of a right surface of the container body 12. A circuit substrate 19 on which a semiconductor memory device is mounted is arranged on a surface of the substrate unit 18. The semiconductor memory device of the circuit substrate 19 stores various information regarding the ink cartridge 11 (for example, information regarding ink colors and ink containing amounts). Terminals 19*a* are provided on the surface of the circuit substrate 19. When the ink cartridge 11 is mounted in the cartridge holder of the printer, the terminals 19*a* contact connection terminals formed in the cartridge holder. This transfers various information between the circuit substrate 19 and a control device (not shown) of the printer.

As illustrated in FIGS. 3 and 4, a rectangular opening 20, a first ink inlet hole 21 having a circular shape, a second ink inlet hole 22 having a circular shape, and an ink supply port 23 having a circular shape are formed in a lower surface of the container body 12 and arranged in this order from the right end to the left end of the lower surface. The ink supply port 23 has a pair of guide walls 23*a* each having a substantial U shape, which are provided at the right end and the left end of the ink supply port 23. The interior of the opening 20 defines an atmospheric air communication chamber 24, which configures a portion of an atmospheric air communication passage. The atmospheric air communication chamber 24 communicates with the exterior of the container body 12, or the atmospheric air, through a non-illustrated atmospheric air exposure port. The atmospheric air communication chamber 24 accommodates a coil spring 25, a valve body 26, and a valve support member 27 in this order from inward to outward.

A rib 28 defines an upper ink chamber 29 and a lower ink chamber 30 in the container body 12. The first ink inlet hole 21 communicates with the upper ink chamber 29 and the lower ink chamber 30 through a narrow passage 21*a* and a narrow ink inlet port 21*b*, which are formed in the container body 12. The second ink inlet hole 22 communicates directly with the lower ink chamber 30. In initial filling of the ink chambers 29, 30, ink is introduced through the ink inlet holes 21, 22. After such initial filling, the first and second ink inlet holes 21, 22 are sealed by a cover film 31 along with the opening 20. The cover film 31 is formed by a polyethylene terephthalate (PET) based film or a nylon (NY) based film exhibiting improved heat resistance.

When the ink cartridge 11 is secured to the cartridge holder of the printer, an ink supply needle (not shown) provided in the cartridge holder is inserted into the ink supply port 23. With reference to FIGS. 2 and 3, the ink supply port 23 is sealed by a film member 32 before the ink cartridge 11 is mounted in the cartridge holder. The film member 32 may be either removed from the ink cartridge 11 before mounting of the ink cartridge 11 in the cartridge holder or penetrated by the ink supply needle of the cartridge holder when the ink cartridge 11 is secured to the cartridge holder.

As illustrated in FIGS. 3 and 4, the interior of the ink supply port 23 accommodates an annular seal member 33 formed of elastomer or the like, a supply valve 34, and a coil spring 35. The seal member 33 allows penetration of the ink supply needle of the cartridge holder into the ink supply port 23. The supply valve 34 is brought into contact with the seal member 33. The coil spring 35 urges the supply valve 34 toward the seal member 33. Specifically, the supply valve 34 is urged by the coil spring 35 to be pressed against the seal member 33, thus closing the ink supply port 23. This constantly prevents the ink from flowing from the interior of the container body 12 to the exterior through the ink supply port 23. Contrastingly, when the ink supply needle of the cartridge holder is inserted into the ink supply port 23, the ink supply needle presses the supply valve 34 inwardly in the ink supply port 23 against the urging force of the coil spring 35. The supply valve 34 is thus separated from the seal member 33. This opens the ink supply port 23, allowing the ink to flow from the interior of the container body 12 to the exterior through the ink supply port 23.

After the ink cartridge 11 is mounted in the cartridge holder of the printer, the printer consumes the ink until the ink is used up. At this stage, the used ink cartridge 11 is removed from the cartridge holder and replaced by a new ink cartridge 11. The used ink cartridge 11 is then refilled with ink and recycled as a reusable ink cartridge without being discarded. This contributes to efficient use of resources and preservation of environments.

In refilling of the used ink cartridge 11, an opening 61 through which ink is introduced is formed in the cover film 31 using a piercing jig 40. The piercing jig 40 will hereafter be explained with reference to FIGS. 5A to 5F.

Figure 5A:
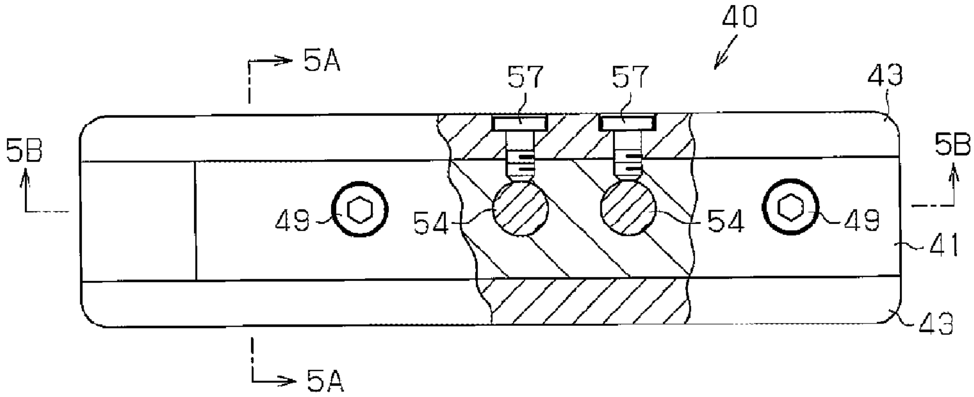
FIG. 5A is a plan view showing a piercing jig.
Figure 5B:
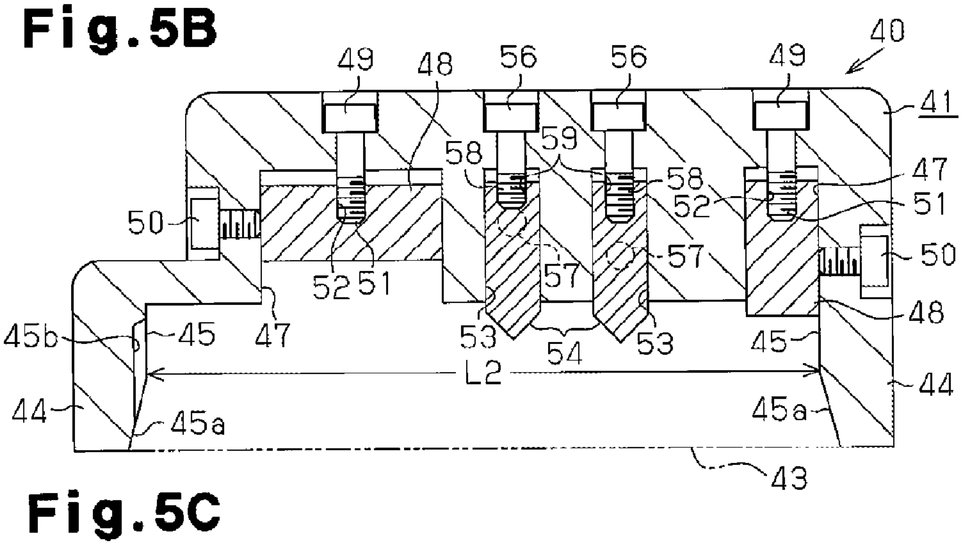
FIG. 5B is a cross-sectional view taken along line 5B-5B of FIG. 5A.
Figure 5C:
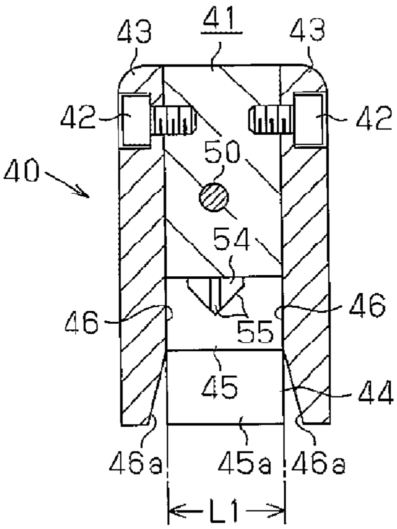
FIG. 5C is a cross-sectional view taken along line 5C-5C of FIG. 5A.

As shown in FIGS. 5A, 5B, and 5C, the piercing jig 40 of the illustrated embodiment has a base body 41 and a pair of joint plates 43. The base body 41 has a substantial U shape as viewed from the side. The joint plates 43 are connected to opposing front and rear surfaces of the base body 41 with bolts 42. The thickness L1 of the base body 41 (see FIG. 5C) is substantially equal to the thickness of the ink cartridge 11. The base body 41 has a pair of legs 44, which extend downward from the opposing left and right ends of the base body 41. The interval L2 between the legs 44 (see FIG. 5B) is substantially equal to the dimension of the ink cartridge 11 in the left-and-right direction.

A pair of opposing inner surfaces 45 of the left and right legs 44 function as guide portions that are slidable on the left and right surfaces of the ink cartridge 11. A tapered surface 45*a* extends from the rear end of each of the inner surfaces 45 and inclines outwardly toward the distal end of the inner surface 45. A groove 45*b* is formed in the inner surface 45 of the left leg 44, as viewed in FIG. 5B. The groove 45*b* slidably receives the guide projection 16 projecting from the left surface of the ink cartridge 11.

With reference to FIGS. 5A and 5C, each of the joint plates 43 is formed by a substantially rectangular plate. The dimension of each joint plate 43 in the left-and-right direction is substantially equal to the dimension of the base body 41 in the left-and-right direction. The dimension of the joint plate 43 in the up-and-down direction is substantially equal to the dimension of the base body 41 (including the legs 44) in the up-and-down direction. Opposing inner surfaces 46 of the joint plates 43 function as guide portions that are slidable on the front surface and the rear surface of the ink cartridge 11. A tapered surface 46*a* extends from the lower end of each of the inner surfaces 46 and is inclined outwardly toward the distal end of the associated one of the joint plates 43.

As illustrated in FIG. 5B, cutouts 47 each having a rectangular shape as viewed from the side are formed near the left and right ends of the lower surface of the base body 41, which are arranged between the two legs 44. The dimension of the left cutout 47 as viewed in FIG. 5B in the left-and-right direction (the width of the left cutout 47) is substantially equal to the interval between the two guide walls 23*a*, which are provided in the ink supply port 23 of the ink cartridge 11. A block 48, or a movable member having a parallelepiped shape, is slidably received in each of the cutouts 47. Each of the blocks 48 is selectively projected from and retracted into the corresponding one of the cutouts 47.

As shown in FIGS. 5A and 5B, the base body 41 has a pair of bolts 49, which extend from the side corresponding to the upper surface of the base body 41 into the corresponding cutouts 47. Each of the bolts 49 is rotatably supported by the base body 41. The base body 41 also has a pair of bolts 50, which extend from the sides corresponding to the left and right surfaces of the base body 41 into the corresponding cutouts 47. Each of the bolts 50 is rotatably supported by the base body 41. An external thread portion 51 is formed in a distal portion of each bolt 49. An internal thread bore 52 is formed in the block 48 received in the corresponding cutout 47. Each of the external thread portions 51 is threaded with the associated one of the internal thread bores 52. The distal surface of each bolt 50 contacts a side surface of the block 48 received in the corresponding cutout 47. The bolts 50 thus restrict movement of the blocks 48 received in the corresponding cutouts 47.

Thus, if the bolts 49 are rotated with the bolts 50 maintained spaced from the corresponding blocks 48, the blocks 48 are moved in the cutouts 47 in the up-and-down direction. For example, if the bolts 49 are rotated clockwise as viewed in FIG. 5A (in a forward direction), the blocks 48 are moved in directions in which the blocks 48 are retracted into the corresponding cutouts 47 (in an upward direction as viewed in FIG. 5B). Contrastingly, if the bolts 49 are rotated counterclockwise as viewed in FIG. 5A (in a reverse direction), the blocks 48 are moved in directions in which the blocks 48 are projected from the corresponding cutouts 47 (in a downward direction as viewed in FIG. 5B).

With reference to FIGS. 5A, 5B, and 5C, a pair of circular bores 53, which correspond to the first ink inlet hole 21 and the second ink inlet hole 22 of the ink cartridge 11, are formed in the lower surface of the base body 41 between the cutouts 47. Each of the circular bores 53 accommodates a blade body 54. Each of the blade bodies 54 has a columnar body and a distal portion. The diameter of the columnar body is slightly smaller than the inner diameter of each circular bore 53. The distal portion has a conical shape as viewed from the side. Each blade body 54 is rotatably supported in the corresponding circular bore 53. In this state, the distal portion of the blade body 54 projects from the circular bore 53.

Figure 5D:
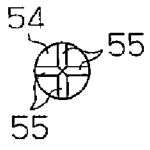
FIG. 5D is a plan view showing a blade body secured to the piercing jig of FIG. 5A.

As shown in FIG. 5D, four blade portions 55 are formed in the distal portion of each blade body 54. The blade portions 55 extend radially from the axis of the blade body 54, as viewed in the axial direction of the blade body 54 from the side corresponding to the distal end of the blade body 54. The four blade portions 55 are spaced at equal angular intervals (in the illustrated embodiment, at 90 degrees). Each of the blade portions 55 extends toward the proximal end of the blade body 54 as the blade portion 55 radially separates from the axis of the blade body 54. In other words, the distal portion of the blade body 54 has a conical shape the top of which coincides with the crossing points of the blade portions 55.

Further, with reference to FIGS. 5A and 5B, the base body 41 has a pair of bolts 56, which extend from the side corresponding to the top surface of the base body 41 into the corresponding circular bores 53. Each of the bolts 56 is rotatably supported by the base body 41. One of the joint plates 43 has a pair of pressing screws 57, which extend from outside the joint plate 43 into the corresponding circular bores 53. The pressing screws 57 configure an adjustment mechanism.

An external thread portion 58 is formed at the distal portion of each of the bolts 56 and threaded with an internal thread bore 59 formed in the proximal portion of the blade body 54 received in the corresponding circular bore 53. The distal surface of each of the pressing screws 57 is pressed against a side surface of the blade body 54 in the corresponding one of the circular bores 53. This restricts rotation of the blade body 54. Thus, by rotating the blade bodies 54 integrally with the corresponding bolts 56 while the blade bodies 54 are threaded with the bolts 56 with the pressing screws 57 maintained separate from the side surfaces of the blade bodies 54, the angular positions of the blade portions 55 are changed in the rotational direction of each blade body 54 about the axis of the blade body 54.

If the bolts 56 are rotated in a retreat direction while the pressing screws 57 are pressed against the side surfaces of the blade bodies 54 to restrict rotation of the blade bodies 54, solely the bolts 56 are retracted. The heads of the bolts 56 are thus exposed from the base body 41. If, in this state, the pressing screws 57 are spaced from the side surfaces of the blade bodies 54, each of the bolts 56 and the associated one of the blade bodies 54, which are integrated through engagement between the external thread portion 58 and the internal thread bore 59, are lowered by the distance corresponding to the amount by which the head of the bolt 56 has been raised. This changes the projection amount of each blade body 54 from the lower surface of the base body 41. Then, in this state, by rotating each pressing screw 57 in a fastening direction to press the pressing screw 57 against the side surface of the corresponding blade body 54, rotation and movement in the up-and-down direction (the axial direction) of the blade body 54 is restricted.

A method for forming openings in the cover film 31 of the used ink cartridge 11, which seals the ink inlet holes 21, 22 and the opening 20, will hereafter be explained with reference to FIGS. 6A and 6B.

Figure 6A:
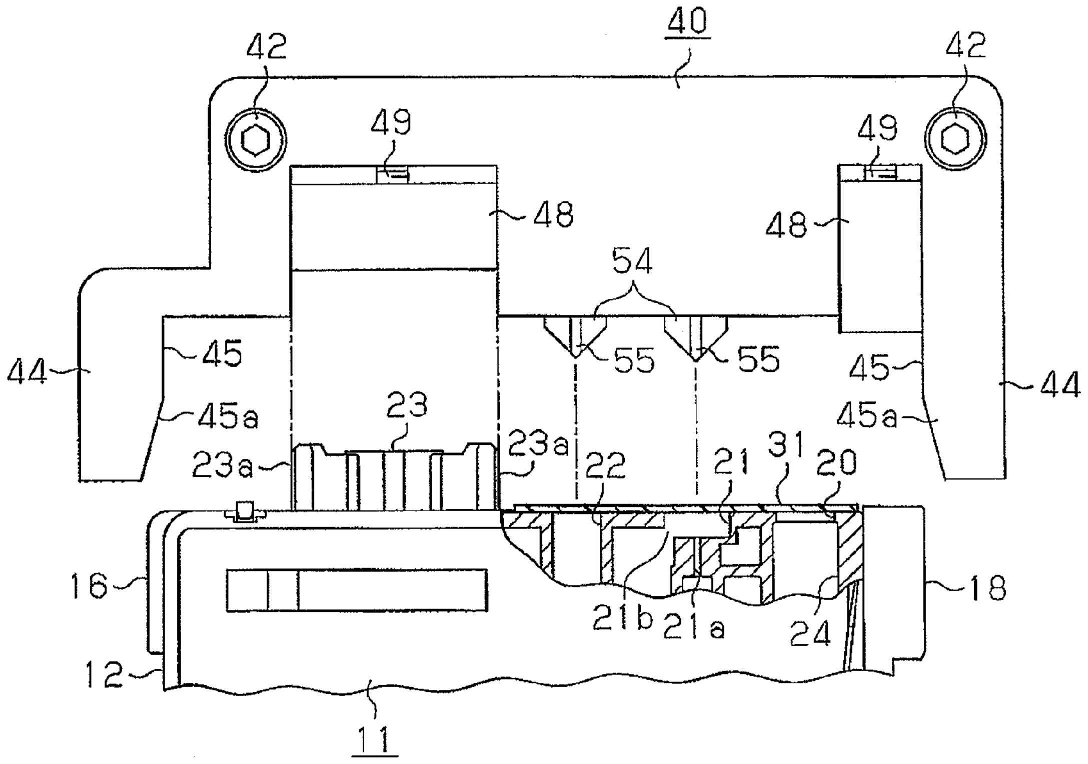
FIG. 6A is a view illustrating a mounted state of a piercing jig in a piercing step.
Figure 6B:
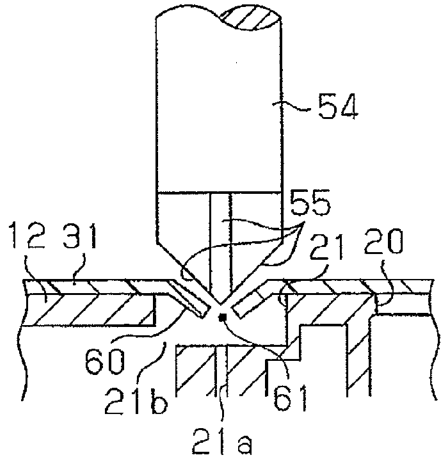
FIG. 6B is a cross-sectional view showing a portion of the piercing jig and a portion of the ink cartridge when an opening is being formed in the ink cartridge.

To form openings in the cover film 31, the used ink cartridge 11 is placed with the lower surface of the ink cartridge 11 facing upward, with reference to FIG. 6A. The film member 32 has been separated from the ink supply port 23 by this time. The piercing jig 40 is arranged in such a manner that the lower surface of the piercing jig 40 opposes the lower surface of the ink cartridge 11, which faces upward, and that the two blade portions 55 oppose the covering areas of the cover film 31 with respect to the ink inlet holes 21, 22 in the up-and-down direction.

Subsequently, with the pressing screws 57 loosened and spaced from the side surfaces of the corresponding blade bodies 54, the bolts 56 are rotated to adjust the angular position of each blade body 54 in the rotational direction. Further, with the bolts 50 loosened and spaced from the corresponding blocks 48, the two bolts 49 are rotated to adjust the positions of the blocks 48 in the corresponding cutouts 47. Specifically, the rotational angular position of each blade body 54 and the position of each block 48 are adjusted in advance to ensure that the angular positions of the blade portions 55 of the blade body 54 coincide with desirable positions in cutting of the cover film 31 and prevent the blade portions 55 from entering the ink inlet holes 21, 22 by an excessive amount when the piercing jig 40 is brought close to the ink cartridge 11 and the blade portions 55 of the two blade bodies 54 penetrate the cover film 31. As has been described, the amount by which the blade bodies 54 project into the corresponding ink inlet holes 21, 22 may be adjusted by rotating the bolts 56 and the pressing screws 57 alternately to change the projecting amounts of the blade bodies 54 from the lower surface of the base body 41.

After the adjustment, the piercing jig 40 is brought closer to the ink cartridge 11. This causes the inner surfaces 45 of the legs 44 of the piercing jig 40 to slide on the left surface and the right surface of the ink cartridge 11 and the inner surfaces 46 of the joint plates 43 to slide on the front surface and the rear surface of the ink cartridge 11. Further, the inner surface of the left cutout 47 slides on the guide walls 23*a* of the ink supply port 23 of the ink cartridge 11 to adjust the movement direction of the cutout 47 with respect to the ink supply port 23.

Immediately before the two blocks 48 contact the lower surface of the ink cartridge 11 facing upward and the distal end of the ink supply port 23, the blade portions 55 of the two blade bodies 54 penetrate the covering areas of the cover film 31 that covers the ink inlet holes 21, 22. This causes the blade portions 55 to form cross-shaped cuts in the cover film 31. Each of the cuts extends radially from the point corresponding to the center of the corresponding one of the ink inlet holes 21, 22.

Each of the cross-shaped cuts forms four cut pieces 60 that are identically shaped and supported in a cantilever manner. The cut pieces 60 thus hang down in the corresponding ink inlet hole 21, 22 separately from one another in radial directions. As a result, with reference to FIG. 6B, an opening 61 is formed in the covering area of the cover film 31 that covers each ink inlet hole 21, 22. At this stage, the blocks 48 of the piercing jig 40 contact the lower surface of the ink cartridge 11 that faces upward and the distal end of the ink supply port 23. This suppresses further proceeding of the blade bodies 54 into the ink inlet holes 21, 22. That is, in the illustrated embodiment, each block 48 serving as the movable member functions as a restricting portion that restricts proceeding of the blade portions 55 of the blade bodies 54 into the ink inlet holes 21, 22 by excessive amounts.

Figure 7:
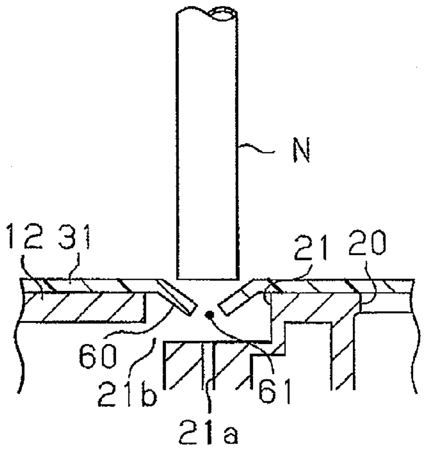
FIG. 7 is a view illustrating a state in which the ink cartridge is filled with ink through the opening.

Afterwards, an ink introduction nozzle N serving as a filling device shown in FIG. 7 is inserted into each of the ink inlet holes 21, 22 through the associated one of the openings 61. Ink refill is thus supplied to the ink chambers 29, 30, which communicate with the corresponding ink inlet holes 21, 22. After such supply of the ink refill, the openings 61, which have been provided for ink refilling, are sealed by a laminated film 70, which is a sealing member. In this manner, the used ink cartridge 11 is recycled as a reusable ink cartridge 11.

Next, a method for sealing the two openings 61 in the cover film 31 using the laminated film 70 will be described with reference to FIG. 8.

Figure 8:
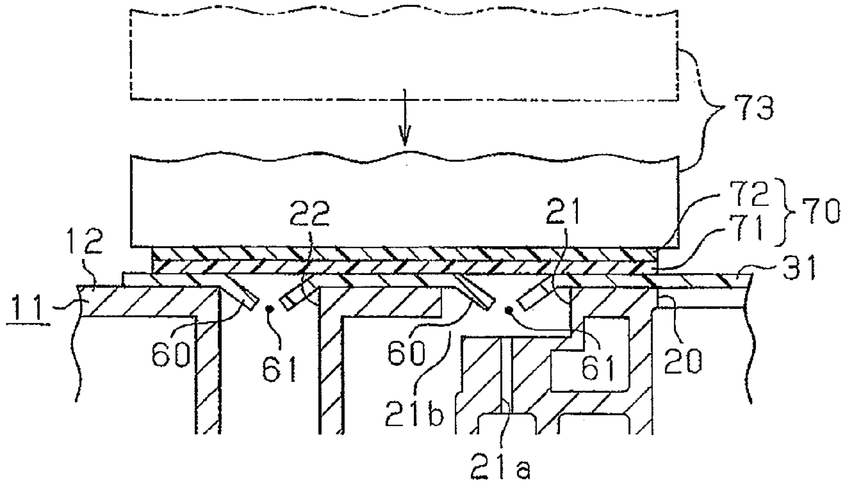
FIG. 8 is a view illustrating a sealing step.

As illustrated in FIG. 8, the laminated film 70 is mounted on the cover film 31 in such a manner as to cover the openings 61 extending through the cover film 31. The laminated film 70 has a two-layer structure including a first film 71 and a second film 72. The first film 71 is molten when heated at a predetermined temperature. The second film 72 cannot be molten at the melting temperature of the first film 71. The second film 72 has an improved heat resistance compared to the first film 71. In other words, in the laminated film 70, the first film 71 forms the outermost layer at one side of the layering directions of the films 71, 72 and the second film 72 forms the outermost layer at the other side.

With the first film 71 maintained in contact with the cover film 31 in such a manner as to cover the ink inlet holes 21, 22 and the corresponding openings 61, the laminated film 70 is placed on the container body 12. The first film 71 is thus opposed to the container body 12 while maintained in contact with the cover film 31. At this position, the first film 71 is heated to be welded to the cover film 31. Since the second film 72 is arranged at an outer side, the second film 72, which has the improved heat resistance, maintains sealing by the laminated film 70.

As the first film 71, a polyolefin (PO) based film or an ester based film or an easy peel open (EPO) film may be employed. If the EPO film is used, the laminated film 70 is bonded to the cover film 31 through welding of the EPO film. Afterward, the EPO film may be easily peeled off the cover film 31 to expose the openings 61 when necessary.

The second film 72 is formed by a polyethylene terephthalate (PET) based film that does not melt at the temperature at which the polyolefin (PO) based film melts, and exhibits enhanced heat resistance compared to the PO based film. The thickness of the first film 71, which is layered with the second film 72, is set to 20 to 60 μm, and, preferably, to 40 μm. By setting the thickness of the first film 71 to 20 μm or greater, formation of a gap between the second film 72 and the cover film 31 is prevented even if the bonding surface of the second film 72 with respect to the first film 71 is uneven. By setting the thickness of the first film 71 to 60 μm or less, the thickness of the first film 71 is prevented from becoming excessively great, which increases the cost and decreases heat conductivity of the first film 71 when the first film 71 is heated.

After the laminated film 70 is placed on the cover film 31, a heater 73 serving as a sealing device is lowered toward the laminated film 70 from above the laminated film 70 as shown in FIG. 8. The heater 73 is heated to a predetermined temperature that melts the first film 71 of the laminated film 70 but does not melt the second film 72. The heater 73 is shaped as a block having a flat pressing surface that contacts the surface of the laminated film 70 (the surface of the second film 72) in a surface contact manner.

Thus, as illustrated in FIG. 8, when the heater 73 contacts the surface of the laminated film 70 in a surface contact manner and heats the laminated film 70, not only the annular areas extending along the circumferences of the openings 61 of the cover film 31, but also the covered areas of the openings 61, which are the interiors of the annular areas, are heated by the heater 73. This ensures reliable melting and welding of the annular areas along the circumferences of the openings 61 on the cover film 31 and heating of the covered areas of the openings 61. As a result, change of strength of the laminated film 70, particularly the first film 71, which is caused by heating, becomes uniform in the entire portion of the laminated film 70. This suppresses variation of the strength in different portions of the laminated film 70.

By melting the first film 71 through heating by the heater 73, the laminated film 70 is firmly welded on the cover film 31. The laminated film 70 thus covers the openings 61 formed in the cover film 31 to seal the openings 61. Afterward, the heater 73 is raised from the position (the contact position) represented by the solid lines in FIG. 8 to the position (the standby position) represented by the double-dotted chain lines in the drawing. This ends the sealing step and, as a result, a recycled and reusable ink cartridge 11 is obtained.

The illustrated embodiment has the following advantages.

(1) The openings 61 formed in the cover film 31 using the piercing jig 40 are provided by the cut pieces 60, which are formed by the cross-shaped cuts in the cover film 31. The cut pieces 60 hang down in the ink inlet holes 21, 22, thus preventing generating fragments of the cover film 31. This also prevents ink refill, which is introduced through the openings 61, from containing fragments. Clogging of a passage (which is, for example, the narrow passage 21*a* or the narrow ink inlet port 21*b*) of the recycled ink cartridge 11 is thus suppressed. As a result, the ink cartridge 11 is effectively recycled.

(2) Using the piercing jig 40, the openings 61 are formed in the covering areas of the cover film 31 with respect to the ink inlet holes 21, 22. Each of the openings 61 has the center corresponding to the center of the corresponding one of the ink inlet holes 21, 22. This facilitates introduction of the ink refill trough the openings 61.

(3) Using the piercing jig 40, the four uniform-sized cut pieces 60 are provided in the covering area of the cover film 31 with respect to each ink inlet hole 21, 22 and extend radially from the center of the covering area. The cut pieces 60 hang down in the corresponding ink inlet hole 21, 22 to provide the opening 61 with a desirable shape. This facilitates insertion of the ink introduction nozzles into the openings 61. Supply of ink refill is thus easily carried out.

(4) When the openings 61 are formed in the cover film 31 by cutting the cover film 31 by the piercing jig 40, the portions of the cover film 31 around the ink inlet holes 21, 22 of the container body 12 are prevented from being damaged. This also suppresses fragmentation of the cover film 31, which may cause clogging of the ink passage or the like. Further, the cut pieces 60, which are formed by the piercing jig 40, are prevented from hanging down in the ink inlet holes 21, 22 by excessive amounts. This prevents blockage of, for example, the narrow passage 21*a* or the narrow ink inlet port 21*b* of the first ink inlet hole 21 by the cut pieces 60. The supply of the ink refill is thus effectively performed.

(5) The blade portions 55 formed at the distal portion of each blade body 54 of the piercing jig 40 are each shaped to extend toward the proximal end of the blade body 54 as the blade portions 55 radially separate from a point on the axis of the blade body 54. The crossing point of the blade portions 55 thus becomes sharp and causes the distal end of each blade body 54 to penetrate the cover film 31 sharply in piercing. Thus, by forming cuts in the cover film 31 while preventing fragments of the cover film 31 being generated, the piercing jig 40 forms the openings 61 with the desirable shapes. As a result, the openings 61 are easily formed in the cover film 31 without rotating the blade bodies 54.

(6) In piercing, the container body 12 contacts the blocks 48, each of which functions as the restricting portion, thus restricting excessive proceeding of the blade portions 55 of the blade bodies 54 into the ink inlet holes 21, 22 of the container body 12. This prevents the container body 12 from being damaged the blade portions 55 that proceed into the ink inlet holes 21, 22 by excessive amounts. Also, the openings 61 formed in each piercing operation are uniformly sized.

(7) The positions of the blocks 48 functioning as the movable members in the corresponding cutouts 47 are changed by rotating the bolts 49, 50. This adjusts the penetrating amount of each blade portion 55 of the blade bodies 54 with respect to the cover film 31, changing the size of each opening 61 that is to be provided. Further, if the bolts 50 are prevented from being rotated, uniformly sized openings 61 are provided constantly.

(8) By loosening the pressing screws 57 serving as the adjustment mechanisms to adjust the angular positions of the corresponding blade bodies 54 in the rotational directions, the extending directions of the cuts formed by the blade portions 55 are changed. In this manner, the positions at which the cut pieces 60 hang down in the ink inlet holes 21, 22 are adjusted. In other words, the positions at which the cut pieces 60 hang down are adjusted in correspondence with the positions of the passage 21*a* or the ink inlet port 21*b* of the ink inlet hole 21.

(9) The inner surfaces 45 of the legs 44 and the inner surfaces 46 of the joint plates 43 of the piercing jig 40 function as guide portions that adjust the penetrating direction of each blade body 54 with respect to the cover film 31 along a direction perpendicular to the cover film 31. Thus, the blade portions 55 of each blade body 54 are guided constantly to the same positions in the covering area of the cover film 31 with respect to the corresponding ink inlet hole 21, 22. As a result, the openings 61 provided in each piercing operation are located at the constant positions.

(10) To seal the openings 61 in the cover film 31, the first film 71 of the laminated film 70 is molten through heating and thus welded on the cover film 31. Further, since the second film 72 is heat resistant, the laminated film 70 ensures improved sealing performance. This provides the ink cartridge 11 with the enhanced sealing performance.

(11) If the first film 71 is formed by the easy peel open film, the laminated film 70 may be removed from the cover film 31 when necessary even after the laminated film 70 is welded on the cover film 31.

(12) The thickness of the first film 71 is 20 to 60 μm. Thus, in melting of the first film 71 through heating by the heater 73, formation of a gap between the second film 72 and the cover film 31 is prevented even if the bonding surface of the second film 72 with respect to the first film 71 is slightly uneven. Further, the cost for the laminated film 70 is prevented from increasing.

(13) The first film 71 is reliably welded on the cover film 31 at the annular areas around the circumferences of the ink inlet holes 21, 22 through heating. The laminated film 70 thus exerts improved sealing performance.

(14) The first film 71 is heated both at the annular areas around the circumferences of the ink inlet holes 21, 22 and the covered areas of the ink inlet holes 21, 22, which are the interiors of the annular areas. This suppresses variation of strength in different areas and provides uniform sealing performance.

The illustrated embodiment may be modified in the following forms.

Figure 5E:
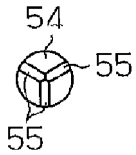
FIG. 5E is a plan view showing a blade body of a modified embodiment.
Figure 5F:
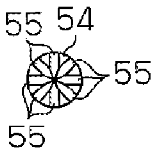
FIG. 5F is a plan view showing a blade body of another modified embodiment.

As illustrated in FIG. 5E, each blade body 54 of the piercing jig 40 may include three blade portions 55 extending radially from a point on the axis of the blade body 54. Alternatively, with reference to FIG. 5F, the blade body 54 may include eight blade portions 55 extending radially from the point on the axis of the blade body 54. In other words, each blade body 54 may be configured in any suitable manner as long as the blade body 54 includes at least three blade portions 55 extending radially from a point corresponding to the distal end of the blade body 54.

The blade portions 55 of each blade body 54, which extend radially, may be spaced not at equal angular intervals but at unequal angular intervals about the axis of the blade body 54.

Alternatively, the blade portions 55 of each blade body 54 may extend radially on a plane perpendicular to the axis of the blade body 54 at the distal end of the blade body 54.

The inner surfaces 45 of the legs 44 and the inner surfaces 46 of the joint plates 43 of the piercing jig 40 do not necessarily have to slide on the corresponding side surfaces of the ink cartridge 11 in piercing. That is, the piercing jig 40 does not necessarily have to guide the ink cartridge 11.

The blade bodies 54 may be fixed to the base body 41 so that the angular positions of the blade bodies 54 in the rotational direction cannot be changed.

The piercing jig 40 does not necessarily have to include the cutouts 47 or the blocks 48. In piercing, the lower surface of the base body 41 may either directly contact or be maintained spaced from a portion of the container body 12 of the ink cartridge 11.

Each blade body 54 may be formed by a blade body having a conical distal end. In this case, the openings 61 are formed by passing the blade body through the cover film 31 from the distal end of the blade body. Specifically, the piercing jig 40 may be a piercing jig having a blade body shaped like a punch. For example, the piercing jig 40 may be conical or shaped like a pyramid. Also in this case, the openings 61 are formed in the cover film 31 without generating fragments of the cover film 31.

Each blade body 54 of the piercing jig 40 may be configured in any suitable manner as long as the blade body 54 provides the cut pieces 60 that are supported in a cantilever manner by penetrating the cover film 31 by the distal end of the blade body 54. For example, the blade body 54 may have a blade portion that is formed at the distal end of the blade body 54 and provides a U-shaped, C-shaped, or H-shaped cut in the cover film 31. Each opening 61 is thus shaped and sized in correspondence with the cut pieces provided by the blade portion. Also in this case, the openings 61 are formed without generating fragments of the cover film 31.

Alternatively, to form the openings 61 by forming the cut pieces 60 in the cover film 31, the cover film 31 may be cut along the outline of the cut pieces 60 using a blade body such as a cutter knife.

The heater 73, which heats the laminated film 70 while pressing the laminated film 70 against the cover film 31, may be shaped in any suitable form as long as the heater 73 is capable of heating the laminated film 70 and melting the first film 71.

The heater 73 may heat solely the annular areas of the laminated film 70 around the circumferences of the two ink inlet holes 21, 22. In this case, the first film 71 is molten only at the annular areas.

The thickness of the first film 71 of the laminated film 70 may be set to a value other than 40 μm as long as the value falls in the range of 20 to 60 μm.

The first film 71 of the laminated film 70 may be a urethane based film or a bonding film with an adhesive property.

The laminated film 70 may have a three-layer structure including an additional film arranged between the first film 71 and the second film 72. That is, the laminated film 70 may be configured in any suitable manner as long as the outermost layer that contacts the cover film 31 is the first film 71 and the opposing outermost layer is the second film 72.

In the illustrated embodiment, the openings 61, which are formed in the cover film 31 of the used ink cartridge 11 to be refilled with the ink, are formed as openings to be sealed. However, the ink inlet holes 21, 22, for example, of the ink cartridge 11 that has been refilled with the ink may be formed as openings that are to be sealed. In this case, the ink inlet holes 21, 22 are sealed by the laminated film 70.

The sealing member that seals the openings 61, which are formed in the cover film 31 of the used ink cartridge 11 to be refilled with the ink, does not necessarily have to be the laminated film 70 that is heated to be welded on the cover film 31. That is, the sealing member may be a sealing stopper made of various materials including silicone rubber.

In the illustrated embodiment, the fluid container is embodied by the ink cartridge 11. However, the fluid container may be a fluid container that contains fluid other than ink (such as liquid, liquefied material containing particles of functional material that are dispersed in or mixed with liquid, or flowable material such as gel, or a solid that is flowable and ejectable as fluid). The “fluid” herein does not include fluid formed solely by gas. The "fluid" includes, for example, liquid (including inorganic solvents, organic solvents, solutions, liquefied resin, and liquefied metal (molten metal)), liquefied materials, flowable materials, and powder particulates.

What is claimed is:

1. A method for recycling a fluid container, the container having a chamber for containing fluid, a supply port for supplying the fluid contained in the chamber to an exterior of the chamber, and a hole for introducing the fluid into the chamber, the hole being covered by a cover film, the method comprising:

forming an opening in an area of the cover film that covers the hole;

refilling the chamber of a used fluid container with the fluid through the opening and the hole;

preparing a laminated film formed by laminating a plurality of films including a first film and a second film, wherein the second film is not meltable at a heating temperature and exhibits an improved heat resistance compared to the first film, the first film forming one of outermost layers of the laminated film, the second film forming the other of the outermost layers;

after refilling the chamber with the fluid through the opening and the hole, placing the laminated film on the cover film with the first film facing the cover film in such a manner that the laminated film covers the opening and the hole; and welding at least an annular area of the laminated film extending along a circumference of the hole to the cover film by heating the laminated film from the side a second film side to melt the first film so that the laminated film sears the opening and the hole.

2. The method according to claim 1, wherein the first film is a polyolefin based film, an ester based film, or an easy-peel film, and wherein the second film is a polyethylene terephthalate based film.

3. The method according to claim 1, wherein the thickness of the first film is 20 to 60 μm.

4. A recycled fluid container, the recycled fluid container comprising:

a chamber for containing fluid;

a supply port for supplying the fluid contained in the chamber to an exterior of the chamber;

a hole for introducing the fluid into the chamber;

a cover film for covering the hole, an opening being formed in an area of the cover film that covers the hole for refilling the chamber with the fluid through the opening and the hole;

a laminated film for sealing the opening and the hole, the laminated film being formed by laminating a plurality of films including a first film and a second film, wherein the first film is meltable at a predetermined heating temperature, and the second film is not meltable at the predetermined heating temperature and exhibits an improved heat resistance compared to the first film, the first film forming one of outermost layers of the laminated film, the second film forming the other of the outermost layers, wherein at least an annular area of the laminated film extending along a circumference of the hole is welded to the cover film with the first film facing the cover film so that the laminated film seals the opening and the hole.

* * * * *